July 20, 1937.  J. B. KOHUT  2,087,690
RADIATOR VALVE
Filed May 8, 1936
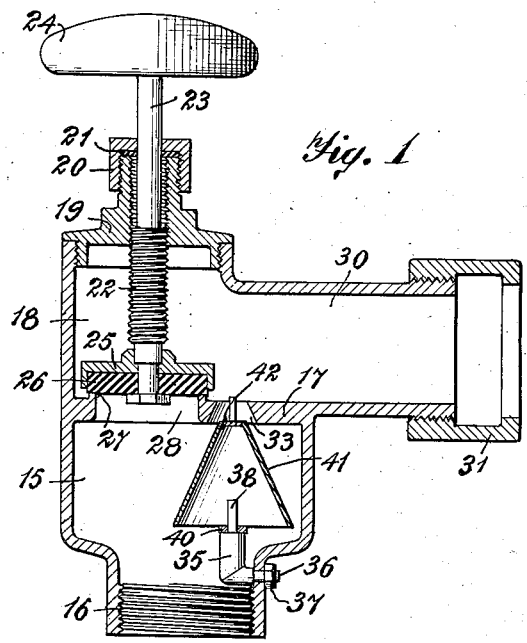
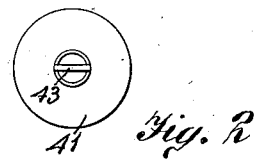
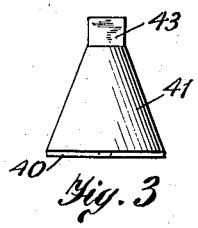
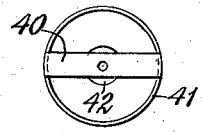
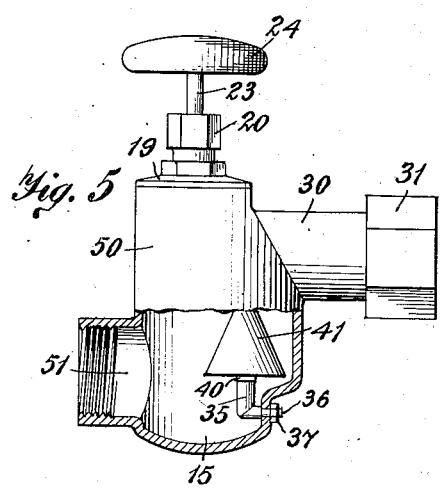
INVENTOR.
JULIUS B. KOHUT
BY
ATTORNEY.

Patented July 20, 1937

2,087,690

UNITED STATES PATENT OFFICE 2,087,690

RADIATOR VALVE

Julius B. Kohut, Brooklyn, N. Y.

Application May 8, 1936, Serial No. 78,527

1 Claim. (Cl. 277—54)

This invention relates to valves and more particularly to types adapted for use in connection with radiators as installed in buildings for warming them.

An object of the invention is to provide a valve for steam radiators that will prevent flooding and surging of the condensed steam when the valve is opened for the passage of steam.

A further feature is in the provision of an escape valve to control the flow of liquid through the system.

Another purpose is to produce a simple but highly effective valve that can be cheaply and economically produced.

These objects are accomplished by the novel and practical construction and combination of parts hereinafter described and shown in the annexed drawing, forming a material part of this disclosure, and in which:—

Figure 1 is a sectional view taken along the center of an embodiment of the invention.

Figure 2 is a top plan view of the self-adjusting element of the valve.

Figure 3 is a side elevational view of the same.

Figure 4 is a bottom plan view thereof.

Figure 5 is a side elevational view of a slightly modified form of the valve, parts being broken away to show the construction.

Referring in greater detail to the drawing, the body of the valve will be seen to consist of a hollow cylindrical lower body portion 15 having a contracted inlet 16 provided with threads to engage a supply pipe.

A transverse partition wall 17 extends across the body 15, above which is an offset dome 18, surmounted by a cap 19 provided with a stuffing box 20 for the reception of a packing washer 21.

The cap 19 is axially threaded to receive a valve stem 22, its smooth upper portion 23 passing through the stuffing box to a manually operable knob 24.

On the lower reduced end of the stem 22 is an annually flanged plunger 25 in which is set a packing disc 26 adapted to seat on a ring 27 raised from the surface of the partition 17 and surrounding an inlet passage 28, the disc 26 being clamped to the plunger 25 by a nut on the extreme end of the stem 22.

Extending laterally from the dome 18, above the partition 17 is an outlet 30 provided with a union 31 by which the valve may be directly connected to a radiator.

Formed through the partition 17 is a conical seat opening 33, contiguous to the valve passage 28 and communicating with the outlet 30.

A support bracket 35 is held within the body 15 by its stem 36 secured by a clamp nut 37.

An upright stem 38 extends from the top of the support 35, and passes through a narrow plate 40 fixed on the lower, larger end of a hollow cone 41 closed at its upper end 42 across which is fixed an upright plate 43, this cone being self-adjustably mounted and adapted to engage the seat 33.

In the modification shown in Figure 5, a different shape of valve body 50 is disclosed, and in place of an axial inlet a radial inlet 51 is substituted, all other parts being substantially as previously described.

In operation, when under steam pressure, should the valve 25—26, shown in Figure 1, be imperfectly closed or defective, steam will enter the radiator, condensing therein and there accumulating in an excessive quantity of water.

The cone 41 pressed tightly against its seat 33 and held by the pressure of the steam, prevents the steam from entering the radiator.

If, however, the pressure of the steam is reduced, or closed completely off, the cone 41 becomes automatically disengaged from its seat 33, allowing the water entrained in the radiator to escape, returning to the steam supply source by its piping, without damage or inconvenience.

While certain preferred embodiments of this device have been shown and described, it will be understood that changes in the form, arrangements, proportions, sizes and details thereof may be made without departing from the scope of the invention as defined in the appended claim.

Having thus described the invention, what is claimed as new and desired to secure by Letters Patent, is:—

In a radiator valve including a casing having lower and upper compartments provided respectively with an inlet and outlet, a valve controlled passage between said compartments and a conical opening offset from said passage, a bracket fixed in the wall of said lower compartment, said bracket having an upturned cylindrical stud, a hollow self-adjusting conical element alined with the mentioned opening, a bar extending across the open base of said element, said bar having an opening slidably fitting said stud, and a guide plate fixed at its lower edge to the apex of said element, said plate being erect and adapted to slidably engage in the mentioned opening.

JULIUS B. KOHUT.